Feb. 15, 1938.                    H. L. NEWBY                    2,108,176
APPARATUS FOR TESTING PLATE SEAMS
Filed June 30, 1936
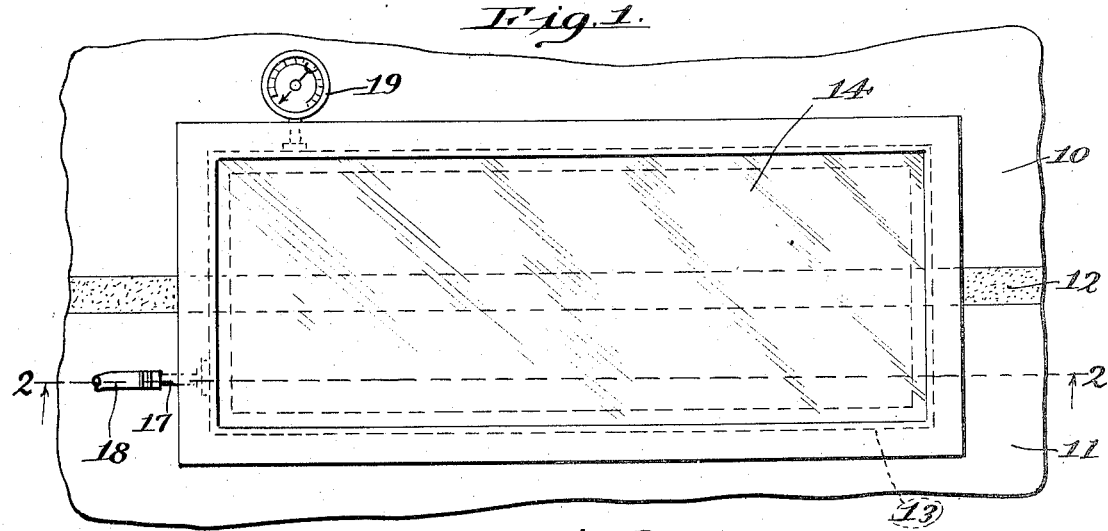
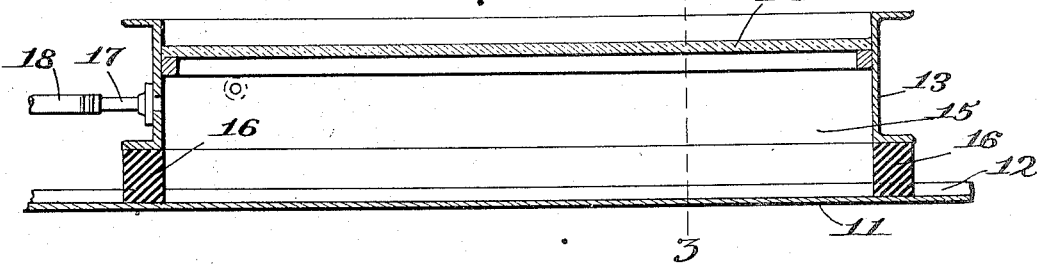
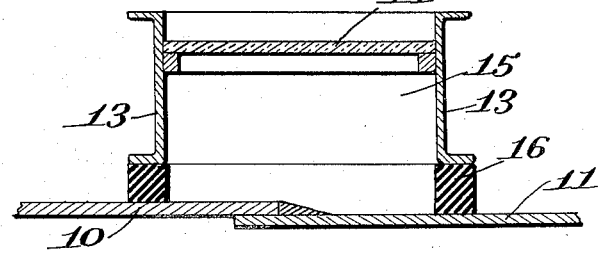
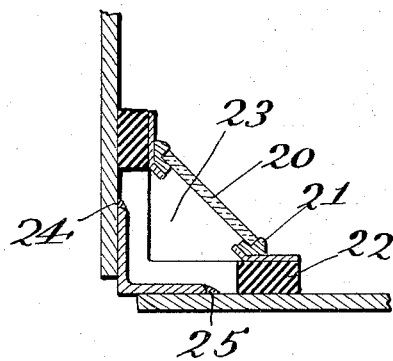
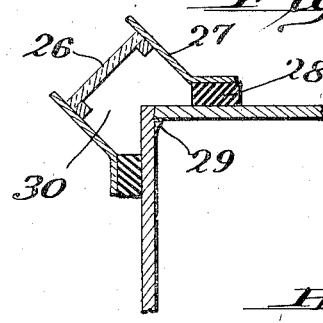
Inventor
Howard L. Newby
by Hazard and Miller
Attorneys.

Patented Feb. 15, 1938

2,108,176

UNITED STATES PATENT OFFICE 2,108,176

APPARATUS FOR TESTING PLATE SEAMS

Howard L. Newby, Los Angeles, Calif.

Application June 30, 1936, Serial No. 88,161

3 Claims. (Cl. 73—51)

This invention relates to an apparatus for testing plate seams.

An object of the invention is to provide a simple and inexpensive but highly satisfactory apparatus for testing various types of plate seams such as are present in steel or other tanks and like containers or reservoirs. Heretofore, where large tanks are made up of plates welded, bolted, riveted, or otherwise secured together, difficulty has been experienced in being able to locate leaks in the seams. For example, in welding the seams of plates of a large gasoline storage tank, welders have been required to proceed very slowly in their welding so that the welds will be free of gas pockets and blowholes which might permit of small leaks. Even when the welding is done very slowly it is difficult to ascertain whether or not leaks are present. This is particularly true where the tank contains a highly volatile liquid, such as gasoline, and is resting on the ground or is partially or wholly embedded in the ground. The leaking liquid, being highly volatile, evaporates so quickly as to conceal the fact that leakage is taking place. In other tanks it is customary in many instances to build the bottom of the tank in an elevated position and endeavor to test its seams for leakage by other means, after which the bottom is lowered into its final position. The lowering frequently creates stresses and strains that produce leaks after the test.

An object of the present invention is to provide a new apparatus for testing plate seams, whether produced by welding, riveting, bolting, or otherwise, which will easily and quickly enable the tester to ascertain the presence of leaks even though such leaks may be so small as to be impervious to liquid but not to gases.

By the improved apparatus, in the case of welded seams the welder may proceed with his welding at a rapid rate and rely upon the tester to inform him of the presence of any gas pockets or blowholes which cause leaks. Furthermore, by use of the improved apparatus tanks may be built in place and either internally or externally tested for leaks with the result that very minute leaks can be ascertained and corrected and the tanks may be built in their final position and then tested, obviating the creation of leaks during lowering of tank bottoms into position.

Another object of the invention is to provide a means for testing tanks and like structures for leaks which will be highly inexpensive as compared with present apparatus for testing.

With the foregoing and other objects in view, which will be made manifest in the following detailed description, and specifically pointed out in the appended claims, reference is had to the accompanying drawing for an illustrative embodiment of the invention, wherein:

Fig. 1 is a top plan view of the major portion of the apparatus used for testing plate seams embodied in the present invention.

Fig. 2 is a vertical section taken substantially upon the line 2—2 of Fig. 1.

Fig. 3 is a vertical section taken substantially upon the line 3—3 of Fig. 2.

Figs. 4 and 5 are views illustrating modified forms of the apparatus that may be employed in carrying out the method embodying the invention herein disclosed.

Referring to the accompanying drawing, wherein similar reference characters designate similar parts throughout, two plates 10 and 11 are illustrated as having their edges lapped and welded by means of a weld 12 forming a seam between the two plates which it is proposed to test for leakage. While the plates are shown as having their edges lapped it will be understood that the invention may be employed with other forms of seams such as, for example, butt welds or butt joints. The apparatus consists of a suitable container having walls 13 and a glass top 14, the glass being readily transparent so that the interior of the container or the chamber 15 formed thereby may be readily viewed therethrough. The bottom of the container is formed with a highly flexible or deformable gasket 16. I find that a material greatly suitable for this gasket consists of sponge rubber to the sides of which are applied liquid rubber latex serving to seal the pores of the sponge rubber. The sponge rubber gasket, being highly deformable, is capable of accommodating itself to the inequalities of the top surfaces of plates 10 and 11 so as to hermetically seal the chamber 15 when the container is applied to a portion of the length of the same. The coating of latex merely seals the pores in the sponge rubber so that air will not seep therethrough. Any equivalent form of highly deformable material may be substituted for sponge rubber in providing the gasket.

In one wall of the container there is formed an outlet indicated at 17 which may be connected by means of a hose 18 to a vacuum pump not shown. Associated with the container there is also preferably provided a vacuum gauge 19.

In order to test the seam 12 for leakage the procedure is as follows:

A soap solution is formed consisting merely of soap and water which is spread or painted along and over seam 12. The container is then positioned over the seam and the vacuum pump started so as to create one or two pounds of vacuum within chamber 15. The presence of the vacuum in the chamber is determined from the vacuum gauge 19. The tester then looks through glass 14 into the chamber to ascertain whether or not any soap bubbles appear along the seam. It will be appreciated that the atmospheric pressure on the under side of seam 12 being greater than the partial vacuum formed in chamber 15 air will tend to flow through any leaks in the seam and will create bubbles in the coating of soap solution. If such bubbles do occur the tester marks their approximate location and the welder, in the case of a welded seam, corrects his work to stop the leak or leaks. If no soap bubbles appear the tester proceeds to shift the container along the seam, following the same procedure at each length of seam covered by the container. While other solutions may be employed as a detecting medium in place of the soap solution, soap solution is highly satisfactory in that it is relatively cheap and minute leaks become readily apparent due to the formation of the soap bubbles.

In the case of bolted and riveted seams the procedure is the same with the exception that in making correction the bolts may be tightened up, rivets tightened or replaced, or the same may be caulked.

The degree of vacuum formed in the chamber does not have to be high. A differential in pressure between the atmospheric pressure and the chamber pressure need only be a few pounds in all ordinary testing. By means of the present apparatus very minute leaks can be detected, some of which are so small that liquids will not ordinarily pass therethrough but only gases, which is important in the case of gas tanks and tanks containing highly volatile liquids. The pressure required to be applied to the container by the tester in order to assure a seal being formed by the gasket 16 does not have to be excessive and as soon as the vacuum starts to form within chamber 15 the atmospheric pressure bearing on the container is effective to press the container tightly against the plates.

In Figs. 4 and 5 I have illustrated slightly modified forms of construction for testing seams. In Fig. 4, which is designed to test inside corner seams, the container is formed merely by a glass plate 20 enclosed within a suitable frame 21, to which the highly deformable gasket 22 is applied. In the end walls, one of which is shown at 23, there may be the outlet formed for connection to the hose leading to the vacuum pump. The vacuum gauge, not shown, may be installed anywhere to communicate with the interior of the chamber formed by this form of construction. The operation and method of use is the same as that previously described. The construction, however, is of such a design as to lend itself to the testing of seams such as those indicated at 24 and 25 on the inside of corners.

In the construction shown in Fig. 5 the glass plate is indicated at 26 mounted within walls 27 which are provided with gaskets 28. This construction is of such shape as to be highly suitable for testing the seam 29 of an external corner. The outlet from the chamber 30 and the vacuum gauge are not shown but are suitably mounted on one of the walls defining the chamber.

From the above described constructions it will be appreciated that an improved apparatus for testing plate seams is provided which enables seams to be easily, quickly, and accurately tested for leaks. It is possible to test seams of tanks erected in their final position and to test old or previously constructed tanks for leaks. In this way the speed of construction and manufacture of large tanks and reservoirs may be materially increased, and at the same time the manufacturer or builder may be assured that the completed tank is leakproof.

The improved apparatus for testing plate seams is very inexpensive both from the labor and material standpoints as compared with present apparatus for testing. It is not necessary to fill the tank to determine leaks or to impose internal pressures thereon as is required in some instances.

Various changes may be made in the details of construction and method of operation without departing from the scope of the invention as defined in the appended claims.

I claim:

1. An apparatus for testing plate seams, comprising an open bottomed container having a transparent wall and having a deformable gasket, means for creating a partial vacuum in the container, and means for determining that a partial vacuum exists within the container.

2. An apparatus for testing plate seams, comprising means providing a transparent wall, means associated with the transparent wall for defining a chamber beneath which a portion of a seam may be isolated, and means for creating a partial vacuum within the chamber.

3. An apparatus for testing plate seams, comprising a transparent wall, means associated with the transparent wall for defining a chamber, a highly deformable gasket associated with said means, and means for creating a partial vacuum within the chamber.

H. L. NEWBY.